Nov. 8, 1927.

J. O. BEAN

GEAR

Filed March 15, 1926

James O. Bean, INVENTOR.

BY Richard B. Owen

ATTORNEY.

Witnesses
C. E. Churchman Jr.
W. E. Nobbe

Nov. 8, 1927.   1,648,715

J. O. BEAN

GEAR

Filed March 15, 1926   2 Sheets-Sheet 2

James O. Bean, INVENTOR.

BY Richard B. Owen
ATTORNEY.

Witnesses
C. C. Churchman Jr.
H. E. Nobbe

Patented Nov. 8, 1927.

1,648,715

UNITED STATES PATENT OFFICE.

JAMES O. BEAN, OF BRAZOS, TEXAS.

GEAR.

Application filed March 15, 1926. Serial No. 94,929.

This invention relates generally to gears and has for its primary object the provision of an improved gear of both simplified and novel construction.

Another object of the present invention is to provide such a novel gear, so devised, constructed and arranged as to eliminate the loose play commonly occurring between gears wherever they are associated.

Another object of the present invention is the provision of such a novel gear of the nature stated which will positively prevent any back-lash or rattling between the same and the gear or gears with which it may be in mesh.

Another object is the provision of a gear which, while designed primarily to take the place of the usual large timing gear on the cam shaft of an automobile engine, can be employed with equal satisfaction in various other places and, in fact, wherever gears are used.

A further object is to provide a gear composed of two sections together with novel means for connecting them together whereby the gear will, with efficiency and reliability, perform all of the functions and accomplish all of the objects claimed herein above.

A still further object is the provision of such a gear which is strong, sturdy and durable in its construction, practical in its application and an advance in the art.

Numerous other objects and advantages of the present invention will become more readily apparent during the course of the following description when taken in connection with the accompanying drawings.

In the drawings forming a part of this application and wherein for the purpose of illustration has been disclosed a preferred embodiment of the present invention.

Figure 1:
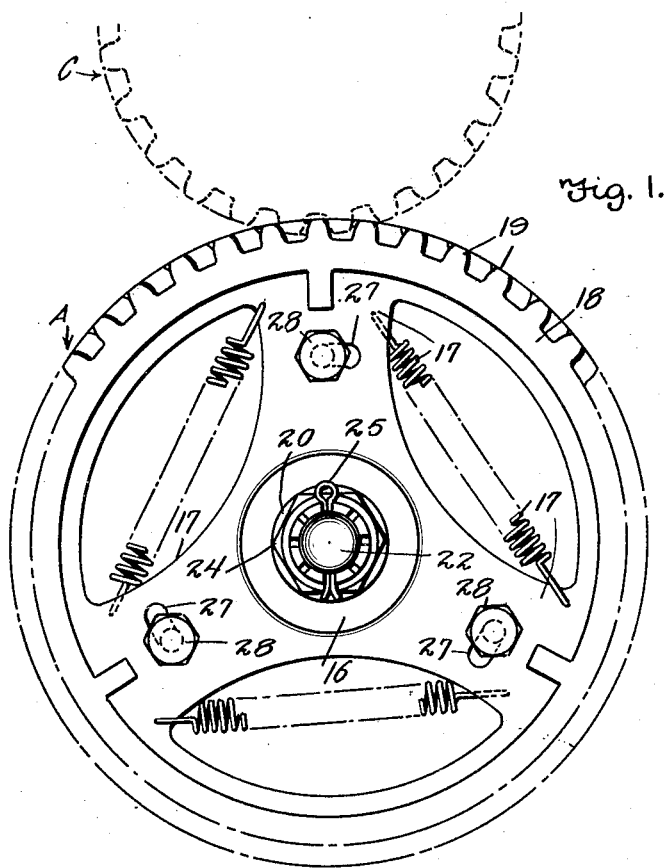
Figure 1 is a front elevation of a gear constructed in accordance with the present invention, showing it mounted on a shaft and in mesh with another gear.

Reference now being had more particularly to the accompanying drawings, wherein like characters of reference denote corresponding parts throughout the several views, the letter A designates the gear, as a whole, B, the cam shaft of an automobile on which the gear is mounted and C, the small time gear on the crank shaft of the automobile and with which the present gear is in mesh.

This application of the gear has been shown merely for the purpose of illustration and it will be readily appreciated that the invention is not to be limited specifically to a timing gear as the same may be employed in various machines and meshed with one or more gears.

The gear A, comprises in its construction, the two sections 10 and 11, the section 10 including a hub 12, from which radiate the three substantially wide spokes 13, the outer ends of which spokes carry the rim 14 provided with the gear teeth 15.

The section 11, also includes a hub 16, from which radiate the three substantially wide spokes 17, carrying at their outer ends the rim 18 provided with the gear teeth 19.

Figure 4:
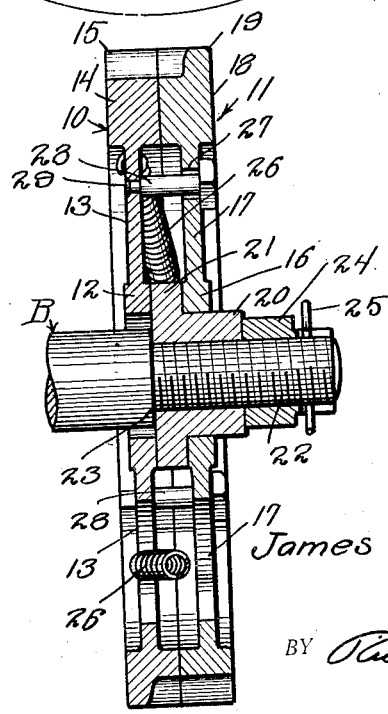
Figure 4 is a sectional view on line 4—4 of Figure 3.

It will be noted upon reference to Figure 4 that the adjacent sides of the rims 14 and 18 abut against one another while the hubs 12 and 16 are spaced slightly apart.

Mounted for limited rotary movement within the hub 16 of the section 11 is a bushing 20, provided at its inner end with a right angularly directed annular flange 21, said flange being positioned between the hubs 12 and 16.

As shown in Figure 4, the bushing 20 carrying the sections 10 and 11 is fitted onto the reduced threaded end portion 22 of the cam shaft B and is held securely thereon and against the shoulder 23 of the shaft by means of a suitable nut 24 and cotter pin 25.

Figure 2:
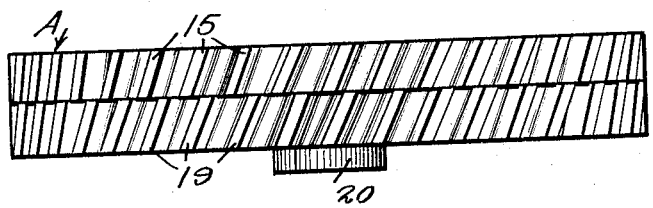
Figure 2 is an edge view of the improved gear.
Figure 3:
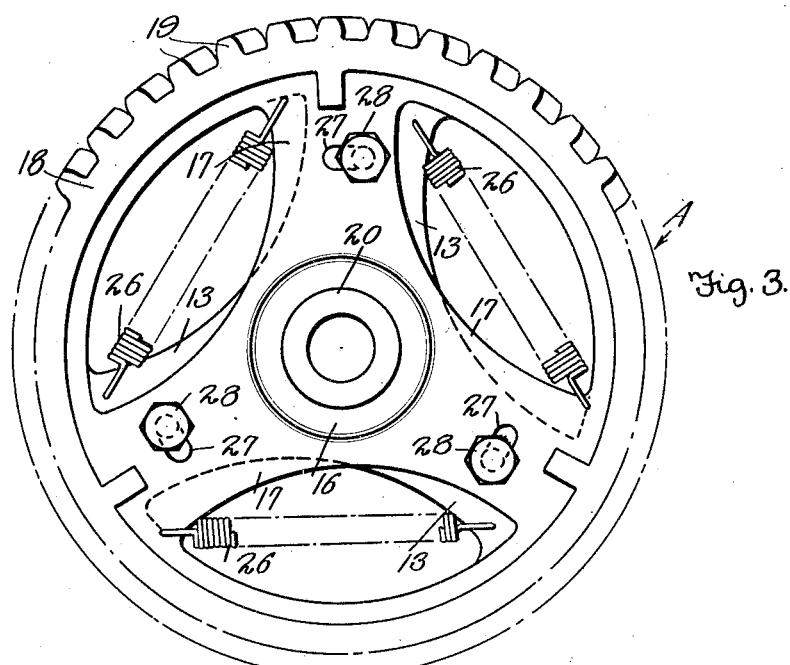
Figure 3 is an elevation of the gear, removed from the shaft, the hub of the gear and certain securing elements being shown in section.

Secured to each of the spokes 13 of the section 10 is one end of a spring 26, the other end thereof being secured to the adjacent spoke 17 of the section 11, the tension of these springs tending to rotate the section 11 to the left in Fig. 3, with respect to the section 10, so that the teeth of the sections will in the un-applied condition of the gear, be out of alinement or in staggered relation with respect to each other as shown in Fig. 2.

For the purpose of limiting the displacement of the gear 11 with respect to the gear 10, the spokes 17 of the sections 11 are provided with arcuate slots 27 through which headed pins 28 extend, the inner ends thereof being somewhat reduced and secured as at 29 within the spokes 13 of the section 10. These pins 28 are engaged by the ends of the slots 27 and serve to limit the movement of the section 11. In order that the gear section 10 may be held against rotation with respect to the bushing 20, any suitable means may be employed, but preferably pins 30 are fitted through openings 31 formed in the hub portion 12 of the gear section 10 and project loosely into openings 32 formed in the hub portion of the gear section 11, the flange 21 of the said bushing 20 being cut away on straight lines at diametrically opposite sides of the bushing so that the engagement of said cut away portions with the pins 30 will restrain the gear section 10 from movement with respect to the said bushing 20.

In the application of the present improved gear, the bushing 20 carrying the sections 10 and 11 is first fitted onto the reduced portion 21 of the shaft B until the teeth 15 of the section 10 are in mesh with the teeth of the gear C after which the section 11 is moved in a clockwise direction against the tension of the springs 27 until the teeth 19 thereof are in registration with the teeth 15 of the section 10 and while they are so registered, the bushing 20 is further fitted onto the shaft until the teeth 19 of the section 11 are also in mesh with the teeth of the gear C. The nut 24 is then applied to the reduced end 22 of the cam shaft and tightened to secure the bushing 20. The tension of the springs 27 will then tend to again move the section 11 with respect to the section 10 and therefore the gear teeth 15 and 19 will impinge upon the opposite sides of the teeth of the gear C with the result that all loose play and back-lash between the gears will be positively eliminated. This impinging of the teeth 15 and 19 against the teeth of the gear C will also eliminate the usual knocks and rattling which occurs between loosely meshed gears.

From the above, it will be readily appreciated that there has been provided a new and novel construction of gear which may be efficiently used as a timing gear in automobiles or which can be used in divers other places and that while there has been shown and described a preferred embodiment thereof, it is to be understood that the same is susceptible of modifications in various particulars and that any such modifications as properly fall within the scope of the appended claims may be resorted to without departing from or sacrificing the spirit of the invention.

What is claimed is:

A gear of the class described comprising two gear sections, each including a hub, spokes radiating therefrom, and a toothed rim supported by the spokes, a bushing having a bore adapting it to be fitted to a shaft, the hub of one of the gear sections rotatably fitting the said bushing, the bushing having a spacing flange disposed between the hubs of the gear sections, the hub of the other gear section being fixed with respect to the bushing, the spokes of the first mentioned section having slots therein, stop pins carried by the second mentioned gear section projecting into the slots and engageable by the end walls thereof to limit the rotative displacement of the first mentioned gear section with respect to the second mentioned gear section, and tension springs connected to, and extending between, relatively displaced spokes of the two gear sections.

In testimony whereof I affix my signature.

JAMES O. BEAN.